(12) United States Patent
Cheng et al.

(10) Patent No.: US 8,854,811 B2
(45) Date of Patent: Oct. 7, 2014

(54) ELECTRONIC DEVICE WITH COVER PLATE

(75) Inventors: Wen-Chieh Cheng, Taipei Hsien (TW); Yao-Ting Lee, Taipei Hsien (TW)

(73) Assignee: Wistron Corp., Taipei (TW)

( * ) Notice: Subject to any disclaimer, the term of this patent is extended or adjusted under 35 U.S.C. 154(b) by 551 days.

(21) Appl. No.: 12/821,240

(22) Filed: Jun. 23, 2010

(65) Prior Publication Data

US 2011/0094766 A1    Apr. 28, 2011

(30) Foreign Application Priority Data

Oct. 23, 2009  (TW) .............................. 98136048 A

(51) Int. Cl.
*H05K 5/03*    (2006.01)
*G06F 1/18*    (2006.01)
*G06F 1/16*    (2006.01)

(52) U.S. Cl.
CPC .............. *G06F 1/181* (2013.01); *G06F 1/1658* (2013.01); *G06F 1/1633* (2013.01)
USPC ............ 361/679.58; 361/679.55; 361/679.02; 361/679.01; 174/562; 174/561; 174/520

(58) Field of Classification Search
USPC ........ 174/50, 50.51, 520, 535, 542, 561, 562; 361/726, 732, 740, 747, 600, 679.01, 361/679.02, 725, 679.55–679.58; 312/223.2, 223.1; 455/575.8, 575.1; 429/97, 100; 292/57–59
See application file for complete search history.

(56) References Cited

U.S. PATENT DOCUMENTS

| | | | | |
|---|---|---|---|---|
| 5,955,700 A * | 9/1999 | Slipy et al. ....................... 174/50 |
| 6,043,977 A * | 3/2000 | Nakajima ................. 361/679.48 |
| 6,929,291 B2 * | 8/2005 | Chen .......................... 292/251.5 |
| 7,303,424 B2 * | 12/2007 | Tu et al. ......................... 439/372 |
| 7,927,730 B2 * | 4/2011 | Ge et al. .......................... 429/97 |
| 8,079,561 B2 * | 12/2011 | Jafari ....................... 248/231.81 |
| 8,424,926 B2 * | 4/2013 | Ueno et al. ....................... 292/58 |
| 2005/0045415 A1 | 3/2005 | Popken et al. |
| 2006/0007647 A1 * | 1/2006 | Peng ............................. 361/683 |
| 2006/0050474 A1 * | 3/2006 | Kusaka et al. ................. 361/683 |
| 2006/0154136 A1 * | 7/2006 | Ge et al. .......................... 429/97 |
| 2008/0074834 A1 * | 3/2008 | Chien et al. ................... 361/683 |
| 2009/0290958 A1 * | 11/2009 | Show et al. .................... 411/510 |
| 2010/0014221 A1 * | 1/2010 | Shi ........................... 361/679.01 |
| 2010/0085691 A1 * | 4/2010 | Yeh et al. ................. 361/679.01 |

FOREIGN PATENT DOCUMENTS

| | | |
|---|---|---|
| CN | 2400818 Y | 10/2000 |
| CN | 2643604 Y | 9/2004 |
| TW | 380809 | 1/2000 |
| TW | 389334 | 5/2000 |
| TW | M244495 | 9/2004 |
| TW | 200602843 A | 1/2006 |

* cited by examiner

*Primary Examiner* — Angel R Estrada
*Assistant Examiner* — Dimary Lopez Cruz
(74) *Attorney, Agent, or Firm* — Birch, Stewart, Kolasch & Birch, LLP

(57) ABSTRACT

An electronic device including a housing, a cover plate, and a button is provided. The cover plate is separably disposed on the housing and corresponds to an opening on the housing. A groove is formed on an edge of the cover plate. The button pivotally connects to an edge of the housing which encompasses the opening. The button can rotate on a housing plate of the housing and corresponds to the position of the groove. The button is behind the edge of the housing while the button is in a release position; a portion of the button extends out and into the groove of the cover plate while the button rotates to a lock position.

19 Claims, 10 Drawing Sheets

ELECTRONIC DEVICE WITH COVER PLATE

BACKGROUND OF THE INVENTION

1. Field of the Invention

The present invention relates to an electronic device and a housing structure thereof, and more particularly, to an electronic device and a housing structure with a separable cover plate.

2. Description of the Prior Art

As the technologies advance, functions of various electronic devices become all purpose. Take laptop computer as an example, external network adaptors or other functional devices are connected to the universal serial bus or other external connection interfaces to expand the functionality of the electronic device. Since users demand the electronic device such as laptop computer with requirements such as integrity and convenience, most of external devices such as network adaptor are built in the electronic device. As specifications of software and hardware continuously update, functional devices built in the electronic device accordingly need to be upgraded. For example, the capacity of random access memory is increased, the hard disk is replaced, the network adaptor and the video adaptor are upgraded, and so on. Therefore, the housing of the electronic device is usually designed with a detachable cover which allows users or engineers to replace the internal components conveniently.

FIG. 1 illustrates a design on the back plate of a conventional laptop computer. As shown in FIG. 1, the back plate 10 of the laptop computer 1 is formed with an opening 13. Users or engineers can access and replace components inside the laptop computer 1 through the opening 13. The cover 30 covers the opening 13 to protect components inside the back plate 10 from damage caused by the external force. As shown in FIG. 1, the cover 30 is conventionally screwed to the back plate 10 on the periphery around the opening 13 by means of screws 50 to cover the opening 13. When replacing the internal component, the user must release the screws 50 with a screw driver or other suitable tool so as to detach the cover 30. Similarly, when the replacement of component is achieved, the tool is again used to lock the screws 50. Such a design is inconvenient in use since the use of additional tool is required, and moreover, the screws 50 are likely lost so that the cover 30 cannot be screwed back.

SUMMARY OF THE INVENTION

An object of the present invention is to provide an electronic device with an easy detachable cover plate.

Another object of the present invention is to provide an electronic device with improved positioning effect on the detachable cover plate.

The electronic device includes a housing, a cover plate, and a button. The housing includes a housing plate formed with an opening, wherein the opening is encompassed by an edge of the housing plate. The cover plate is separably disposed on the housing plate and correspondingly covers the opening. A groove is formed on an edge of the cover plate. In addition to the top opening of the groove, the groove has a further opening formed on the edge of the cover plate.

The button pivotally connects to the edge of the housing which encompasses the opening. The button can rotate on the plane of the housing plate and correspond to the groove of the cover plate. The button has a long arm portion and a short arm portion disposed on two opposite ends. A distance between the edge of the long arm portion and the rotation center of the button is longer than a distance between the edge of the short arm portion and the rotation center.

The button can rotate between a release position and a lock position. When the button rotates to the release position, the short arm portion faces the opening. The long arm portion is behind the short arm portion and retreats behind the edge of the housing plate. In this configuration, the button and the cover plate do not interfere with each other so that the cover plate can be freely separated from the housing plate. When the button rotates to the lock position, the long arm portion of the button extends out the edge of the housing plate and into the groove of the cover plate. In this configuration, the long arm portion interferes with the cover plate, so that the cover plate cannot be separated from the housing plate along a direction perpendicular to the housing plate, i.e. Z direction.

DETAILED DESCRIPTION OF THE PREFERRED EMBODIMENT

The present invention provides an electronic device and a housing structure thereof. In a preferred embodiment, the electronic device includes a laptop computer; however, in different embodiments, the electronic device may include the personal computer, the electronic reader, the mobile communication device, the video and audio devices, or other types of electronic devices.

Figure 1:
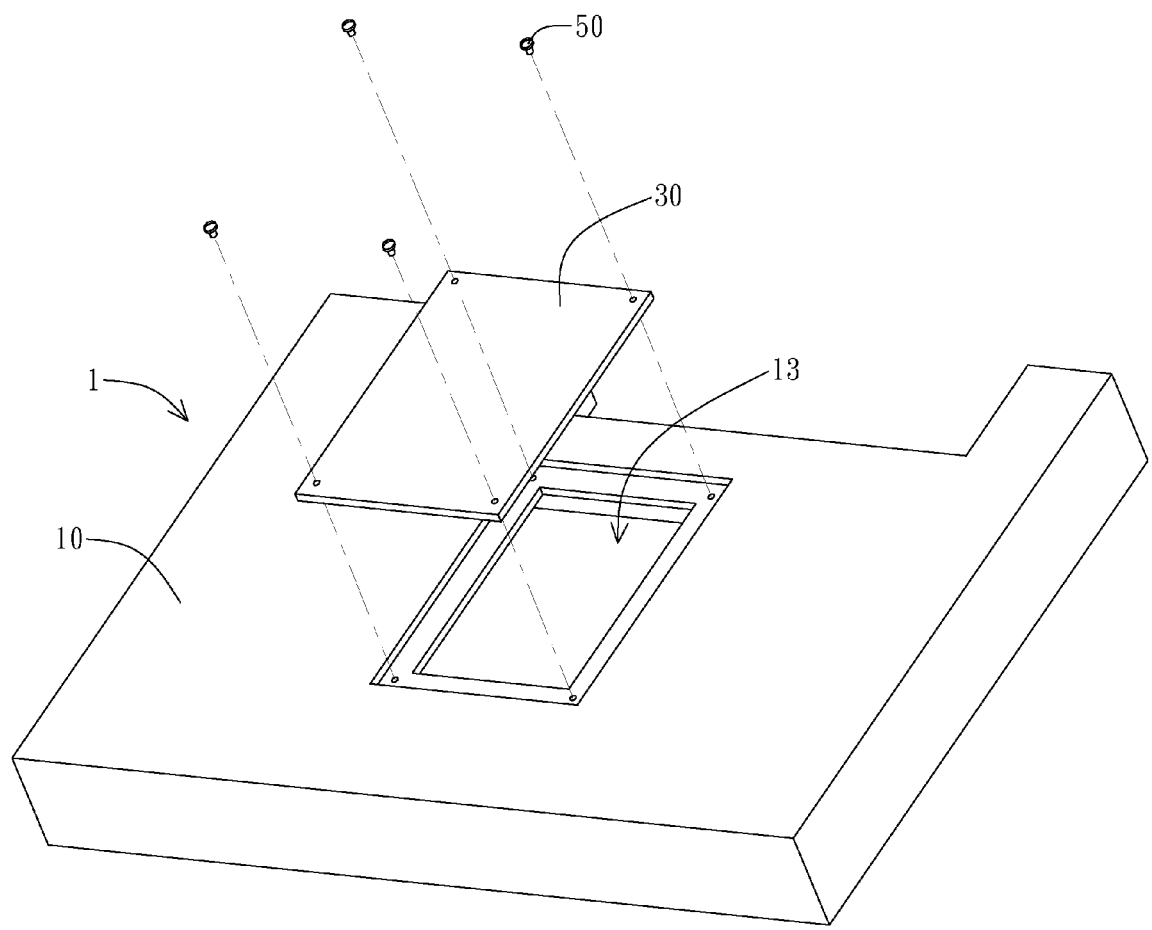
FIG. 1 illustrates a schematic view of a conventional electronic device.
Figure 2:
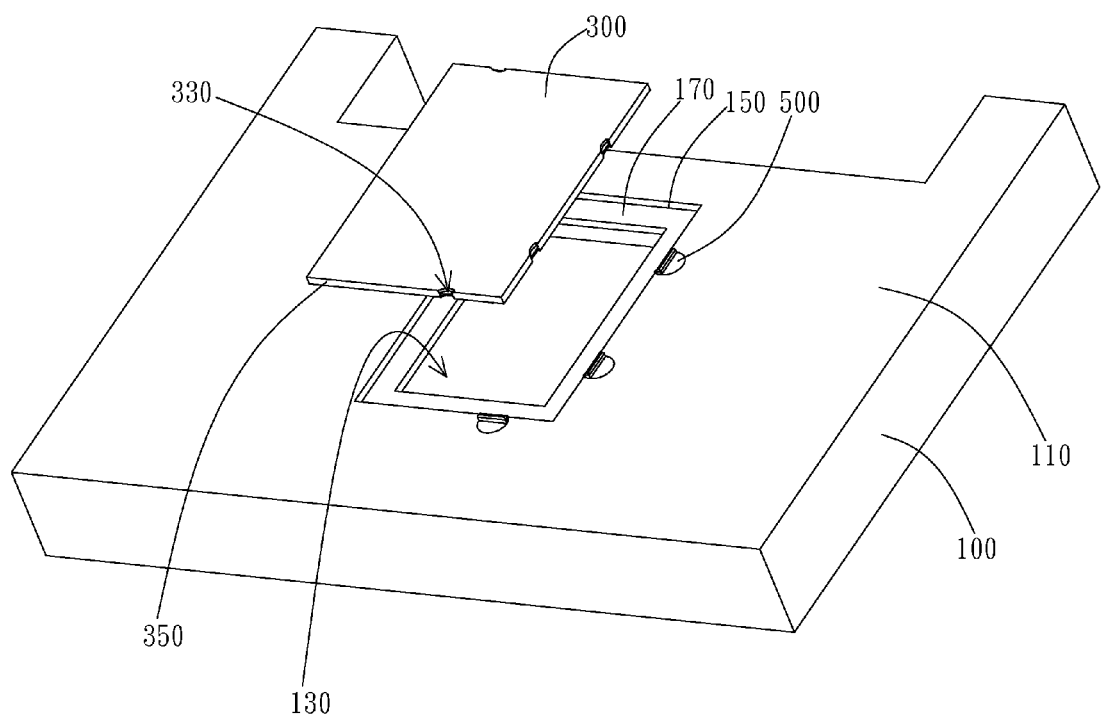
FIG. 2 illustrates a schematic view of an electronic device in accordance with one embodiment of the present invention.

In the embodiment of FIG. 2, the electronic device includes a housing 100, a cover plate 300, and a button 500. The housing 100 has a housing plate 110. In this embodiment, the housing plate 110 is on the bottom of the housing 100 to serve as a back plate. However, in other embodiments, the housing plate 110 can be a side plate or even a front plate of the housing 100. The housing plate 110 is formed with an opening 130. The opening 130 is encompassed by an edge 150 of the housing plate 110. As shown in FIG. 2, the opening 130 is preferably formed in rectangular. However, in different embodiments, the opening 130 can be formed in circular or other shape as appropriate.

As shown in FIG. 2, the cover plate 300 is separably disposed on the housing plate 110 and correspondingly covers the opening 130. In this embodiment, the cover plate 300 and the opening 130 have the same shape to completely cover the opening 130. Moreover, the lower portion of the edge 150 of the housing plate 110 encompassing the opening 130 extends inwardly into the opening 130 to form a support plate 170. The edge 350 of the cover plate 300 is placed on the support plate 170 and supported by the support plate 170 from falling into the opening 130. Moreover, the edge 350 of the cover plate 300 can be encompassed by the upper portion of the edge 150 of the housing plate 110 so that the top face of the cover plate 300 and the top face of the housing plate 110 are preferably coplanar. The edge 350 of the cover plate 300 and the edge 150 of the housing plate 110 are preferably most closely adjacent, i.e. substantially without a gap; however, in consideration of manufacture tolerance, a slight gap is allowed to exist.

Figure 3:
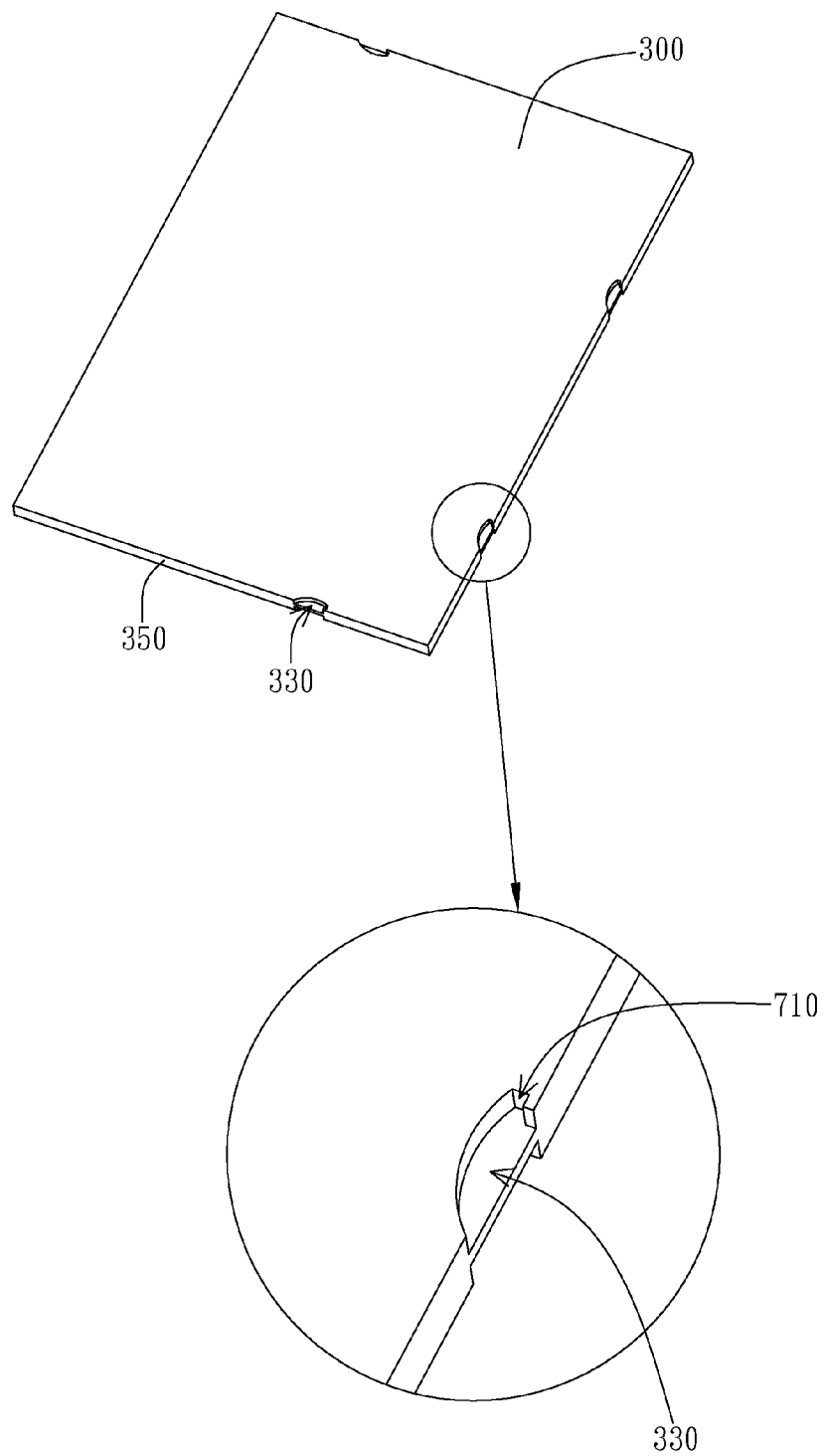
FIG. 3 is a schematic view of an embodiment of the cover plate.

As shown in FIG. 2 and FIG. 3, a groove 330 is formed on the edge 350 of the cover plate 300. In this embodiment, the groove 330 is a half-moon-shaped groove with a bottom which is recessed from the top face of the cover plate 300. In other words, the groove 330 is formed from the top face but not penetrating through the cover plate 300. In addition to the opening on the top face, the groove 330 also has an opening on the edge 350 of the cover plate 330 to correspond to the edge 150 of the housing plate 110. A first engaging part 710 is formed on the sidewall of the groove 330 in a direction parallel to the housing plate 110. In the embodiment of FIG. 3, the first engaging part 710 is an engaging hole which extends along the tangential direction of the arch side of the groove 330 and communicates with the groove 330. However, in different embodiments, the first engaging part 710 can be a hook extending from the sidewall of the groove 330 towards the groove 330 or other positioning mechanism as appropriate.

Figure 4:
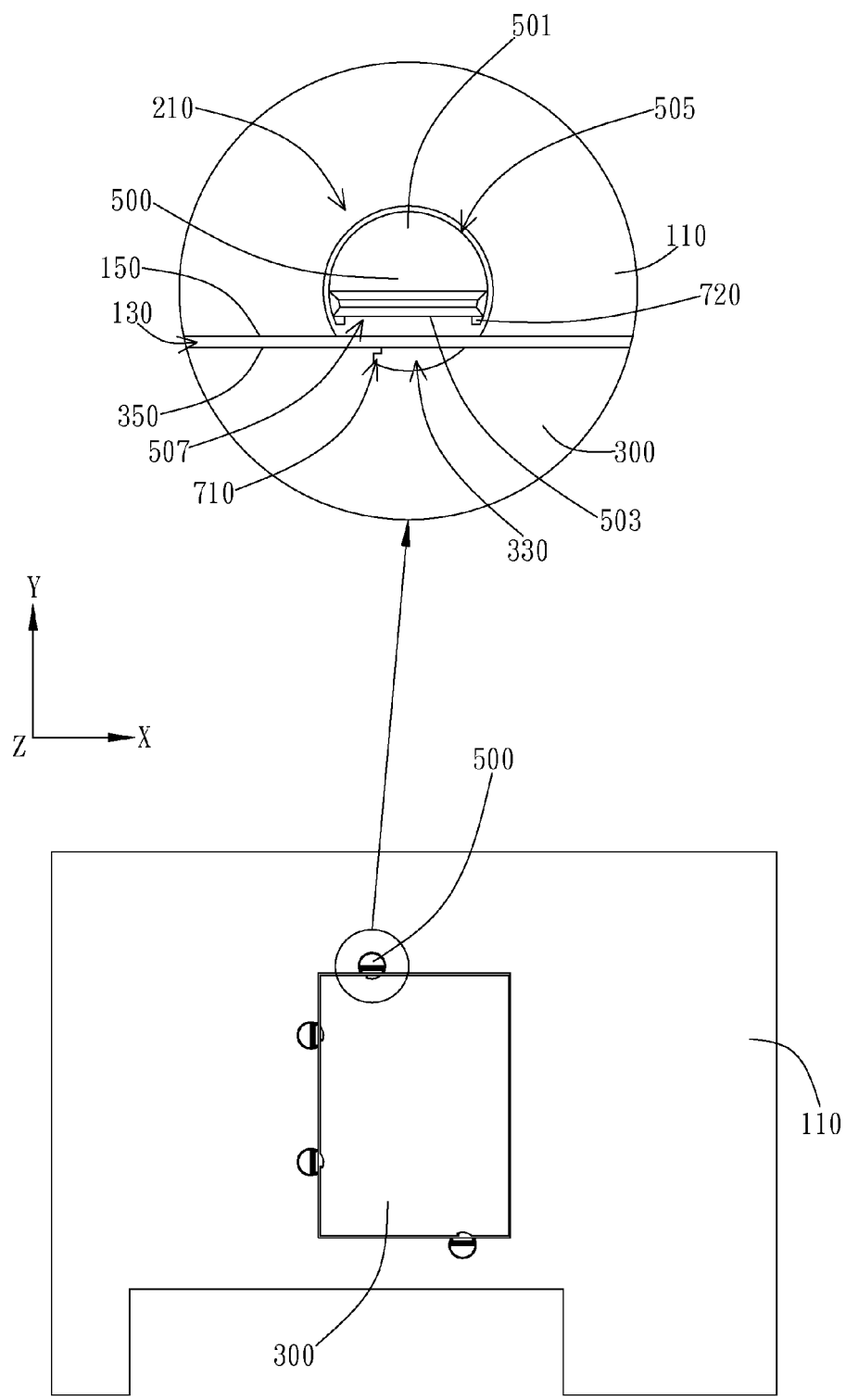
FIG. 4 is a schematic view of an embodiment showing the button in the release position.

In the embodiment of FIG. 2 and FIG. 4, the button 500 pivotally connects to the edge 150 of the housing plate 110, which encompasses the opening 130. The button 500 can rotate on the plane of the housing plate 110 and correspond to the position of the groove 330 of the cover plate 300. The button 500 has a long arm portion 501 and a short arm portion 503 distributed on two opposite ends. A distance between the outer edge of the long arm portion 501 and the rotation center of the button 500 is preferably greater than a distance between the rotation center of the button 500 and the edge 150 of the housing plate 110. A distance between the outer edge of the short arm portion 503 and the rotation center of the button 500 is preferably less than the rotation center of the button 500 and the edge 150 of the housing plate 110. In this embodiment, the button 500 is formed as a half-moon-shaped plate with a curve side 505 and a chord side 507. However, in different embodiments, the button 500 can be formed in other shape such as oval shape or triangular shape, instead of half-moon shape.

As shown in FIG. 4, the chord side 507 connects two ends of the curve side 505 and forms a straight line. From other aspect, the half-moon-shaped plate can be formed by cutting a portion from a circular plate. The remaining portion of the circumference is the curve side 505, and the cut line is the chord side 507. In this embodiment, the cut-off portion has an area smaller than that of the remaining half-moon-shaped plate. Therefore, a central angle passing two ends of the curve side 505 of the half-moon-shaped plate is greater than 180°.

Furthermore, the rotation center of the button 500 is defined on the center of curvature of the curve side 505, so that each point on the curve side 505 has a same path during rotation.

As show in FIG. 4, in this embodiment, the curve side 505 of the half-moon-shaped plate is the long arm portion 501 and the chord side 507 is the short arm portion 503. Moreover, the long arm portion 501 is formed with a second engaging part 720 in the direction parallel to the housing plate 110. The second engaging part 720 corresponds to the first engaging part 710. In the embodiment of FIG. 4, the second engaging part 720 is a hook protruding from one end of the curve side 505 along the tangential direction. However, in different embodiments, in the situation of corresponding to the first engaging part 710, the second engaging part 720 can be an engaging hole on one end of the curve side 505 recessed along the curve side 505 inwardly towards the button 500. Furthermore, in this embodiment, the second engaging parts 720 are formed on two ends of the curve side 505. Therefore, when the first engaging part 710 on the cover plate 300 has a direction change, the button 500 can rotate in different direction to engage the first engaging part 710 with the second engaging part 720 on different end.

Figure 5:
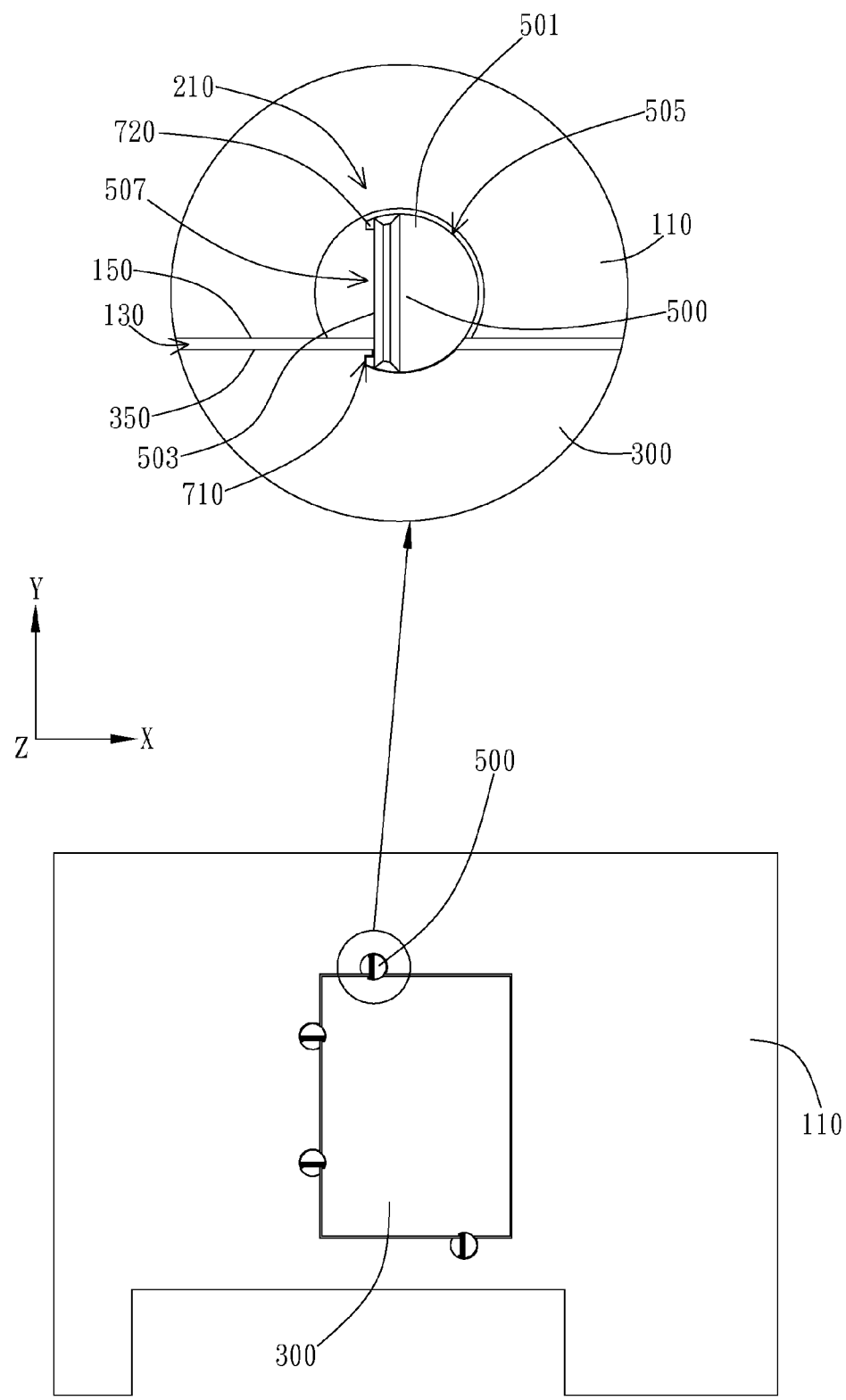
FIG. 5 a schematic view of an embodiment showing the button in the lock position.

The button 500 horizontally rotates between a release position 210 and a lock position 230 with respect to the cover plate 300. When the button 500 is in the release position 210 as shown in FIG. 4, the short arm portion 503 of the button 500 faces the opening 130, while the long arm portion 501 is behind the short arm portion 503 and retreats behind the edge 150 of the housing plate 110. In this configuration, the button 500 and the cover plate 300 do not interfere with each other, so that the cover plate 300 can be freely separated from the housing plate 110. When the button 500 rotates to the lock position 230, as shown in FIG. 5, the long arm portion 501 of the button 500 extends out the edge 150 of the housing plate 110 and into the groove 300 of the edge 350 of the cover plate 300. In this configuration, the long arm portion 501 will interfere with the cover plate 300, so that the cover plate 300 cannot be separated from the housing plate 110 along a direction perpendicular to the housing plate 110, i.e. Z direction.

Furthermore, the second engaging part 720 of the button 500 is inserted into the first engaging part 710 which is formed as an engaging hole, so that the first engaging part 710 and the second engaging part 720 are engaged with each other. Due to this engagement, the cover plate 300 and the housing plate 110 are restricted to move relative to each other horizontally on the XY plane of the housing plate 110. As described above, due to the production and assembly requirements, the cover plate 300 and the housing plate 110 are designed with a gap therebetween to resolve the manufacture tolerance. Therefore, the engagement relationship between the first engaging part 710 and the second engaging part 720 can prevent the cover plate 300 and the housing plate 110 from moving relative to each other due to the gap.

Figure 6A:
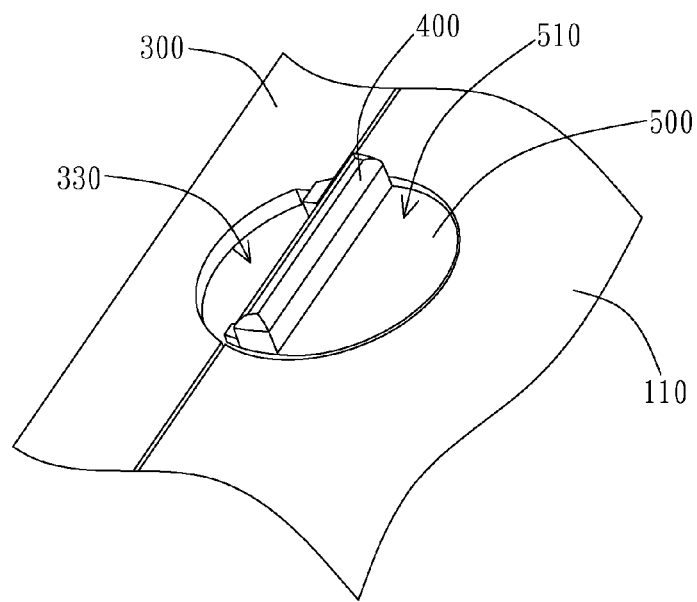
FIG. 6A is a schematic view of an embodiment of the button.
Figure 6B:
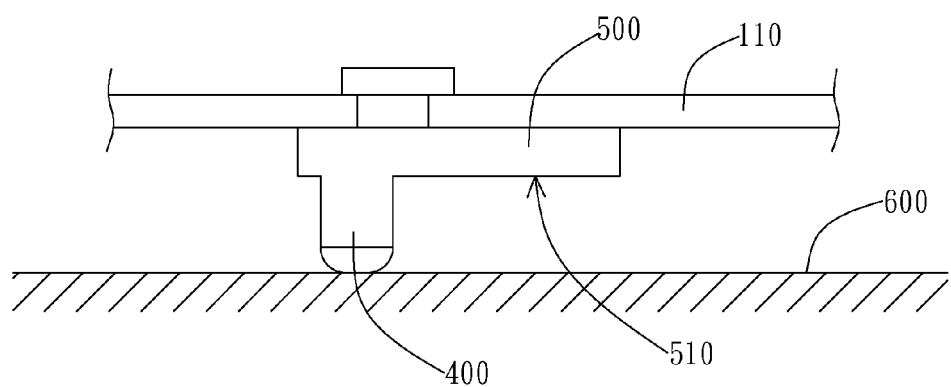
FIG. 6B is a schematic view of the button touching the working surface.

As shown in FIG. 6A, a spacer 400 protrudes from the top face 510 of the button 500. When the housing 100 is placed on the working surface 600, as shown in FIG. 6B, the surface of the housing plate 110 and the top face 510 of the button 500 will face the working surface 600. At this point, the spacer 400 serves as a foot pad which contacts the working surface 600. With the disposition of the spacer 400, a gap exits between the housing plate 110 and the working surface 600 to allow air flow therethrough to facilitate heat dissipation and to reduce the occurrence of scratches on the housing plate 110 and the cover plate 300 due to the friction with the working surface 600. In this embodiment, the spacer 400 is formed as a protruding ridge and disposed across the surface of the button 500. Since the top face of the button 500 is formed as a portion of a circle, the spacer 400 extends parallel to the diameter direction of the button 500. When intending to rotate the button 500, a force can be conveniently exerted on the ridge-form spacer 400. However, in different embodiments, the spacer 400 can be formed in columnar shape or other shapes with the foot pad effect. Moreover, in a different embodiment, the button 500 may not have the spacer 400. In this case, the force can be exerted on the edge of the short arm portion 503 to rotate the button 500.

Figure 7A:
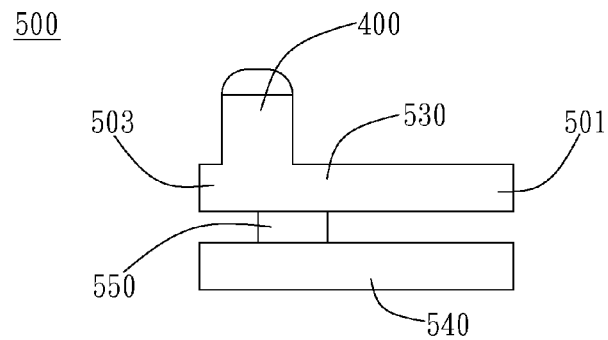
FIG. 7A is a side view of an embodiment of the button.
Figure 7B:
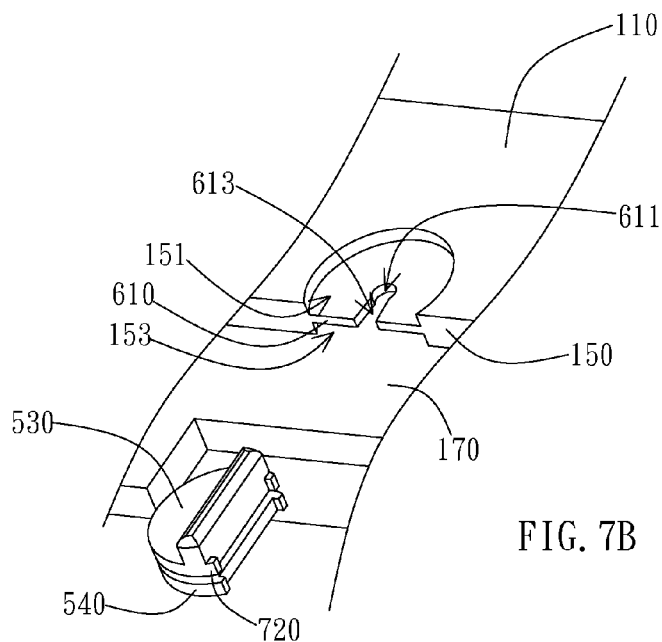
FIG. 7B is a schematic view of an embodiment showing the combination of the button and the second recess.

In the embodiment of FIG. 7A, the button 500 includes a first plate 530, a second plate 540, and a pivot 550. The first plate 530 and the second plate 540 are preferably parallel to each other. Two ends of the pivot 550 are connected to the inner faces of the first plate 530 and the second plate 540, respectively. The first plate 530 and the second plate 540 can pass through the housing plate 110 to connect with each other by means of the pivot 550. In this embodiment, the first plate 530 and the second plate 540 have the same shape and both are formed with the short arm portion 503 and the long arm portion 501. As shown in FIG. 7B, the housing plate 110 has an upper face and a lower face on the edge 150 around the opening 130 correspondingly to form a first recess 151 and a second recess 153. The first recess 151 and the second recess 153 both have openings on the edge 150 to face the cover plate 300, and a first separator 610 is disposed between the first recess 151 and the second recess 153. The first separator 610 is formed with a pivot hole 611 to communicate the first recess 151 with the second recess 153. When the button 500 pivotally connects the housing plate 110, the pivot 550 can be rotatably accommodated in the pivot hole 611, and the first plate 530 and the second plate 540 are accommodated in the first recess 151 and the second recess 153, respectively. As shown in FIG. 7B, the pivot hole 611 communicates with the edge face of the edge 150 of the housing plate 110 via a connecting slot 613, so that the pivot 550 is engaged into the pivot hole 611 through the connecting slot 613.

Figure 7C:
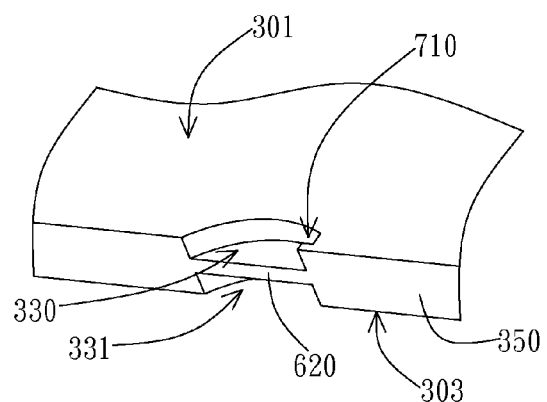
FIG. 7C is a schematic view of the groove and the sub-groove in accordance with one embodiment.
Figure 8A:
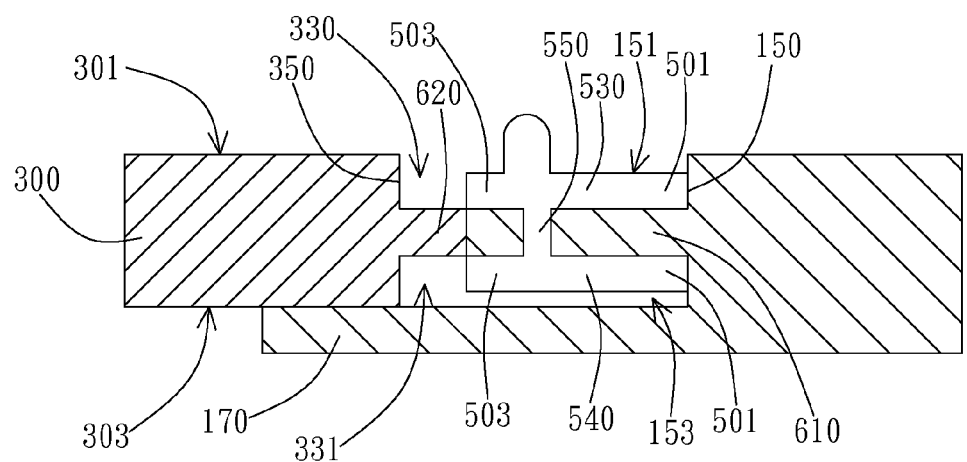
FIG. 8A is a schematic cross-sectional view of an embodiment showing the button in the release position.
Figure 8B:
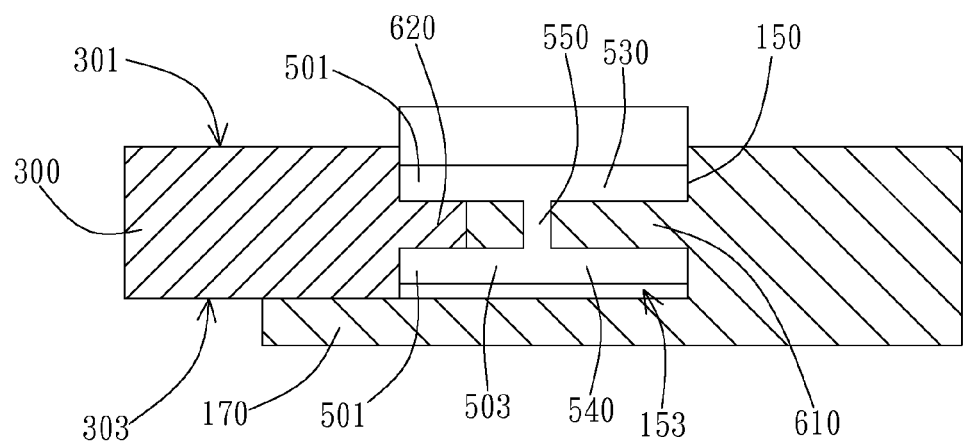
FIG. 8B is a schematic cross-sectional view of an embodiment showing the button in the lock position.

As shown in FIG. 7C, the cover plate 300 has a top face 301 and a bottom face 303 opposite to each other. The groove 330 is formed on the top face 301 of the cover plate 300 while a sub-groove 331 opposite to the groove 330 is formed on the bottom face 303. The groove 330 and the sub-groove 331 form openings on the edge face of the edge 350 of the cover plate 300 and communicate with or correspond to the first recess 151 and the second recess 153 of the housing plate 110, respectively. As shown in FIG. 8A, when the button 500 is in the release position 210, the first plate 530 and the second plate 540 are fully accommodated in the first recess 151 and the second recess 153 of the housing plate 110 and do not extend into the groove 330 and the sub-groove 331 of the cover plate 300. As shown in FIG. 8B, when the button 500 is in the lock position 230, the long arm portions 501 of the first plate 530 and the second plate 540 extend out of the first recess 151 and the second recess 153 and are received in the groove 330 and the sub-groove 331 of the cover plate 300. At this point, the cover plate 300 is located between the first plate 530 and the second plate 540.

Specifically, as shown in FIG. 8B, a second separator 620 is disposed between the groove 330 and the sub-groove 331. When the button 500 rotates to the lock position 230, the second separator 620 is located between the first plate 530 and the second plate 540 and clamped by the first plate 530 and the second plate 540. With such a design, the housing plate 110 and the cover plate 300 are firmly positioned on relative positions in the direction perpendicular to the housing plate 110.

Figure 9A:
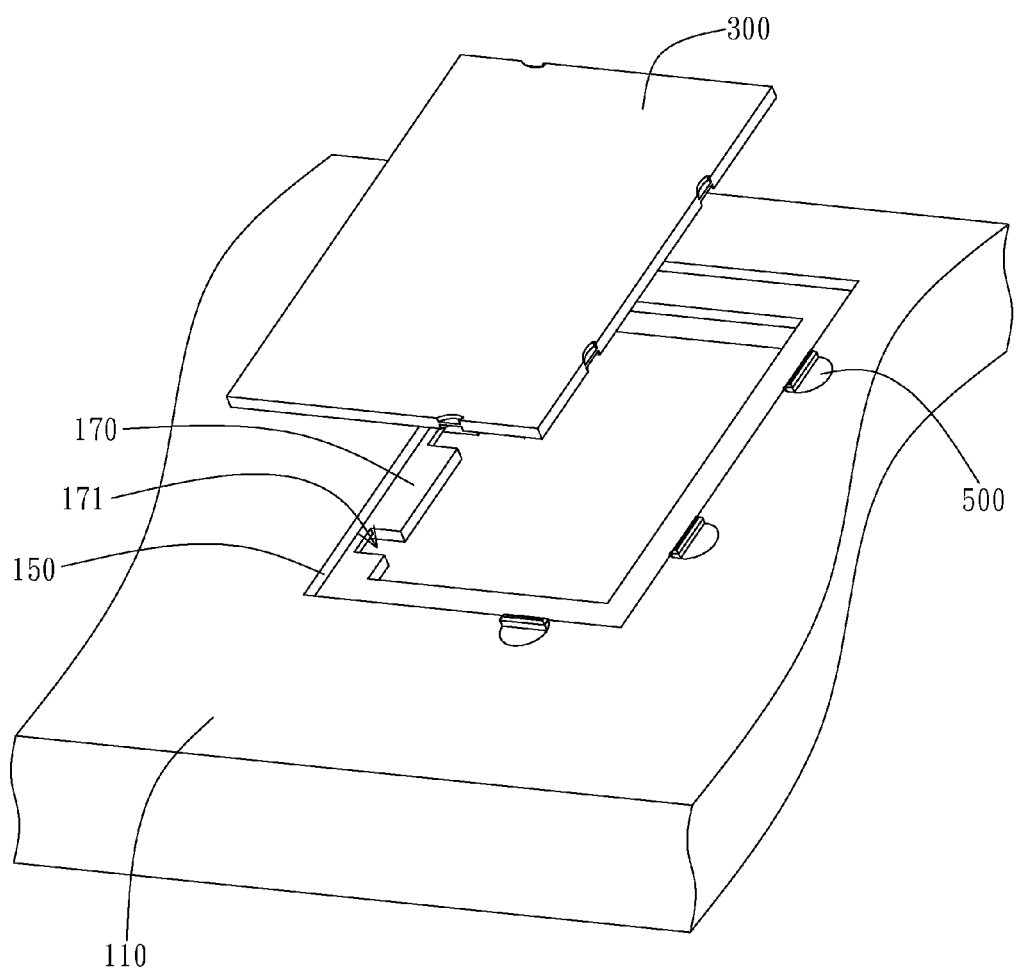
FIG. 9A is a schematic view of an embodiment showing the support plate provided with breaches.
Figure 9B:
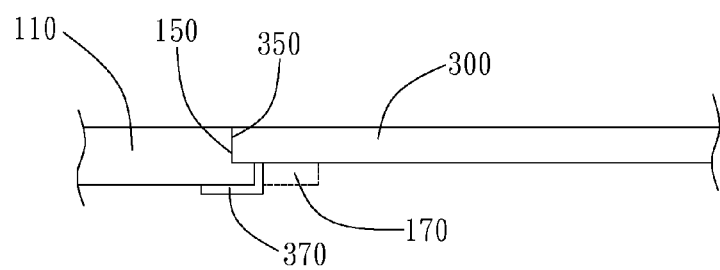
FIG. 9B is a schematic view of an embodiment showing the protruding part engaged with the breach.

In the embodiment of FIG. 9A and FIG. 9B, the support plate 170 on the edge 150 of the housing plate 110 is formed with at least one breach 171. The bottom edge of the cover plate 300 is formed with a protruding part 370 outwardly extending from the cover plate 300 and corresponding to the breach 171. When the cover plate 300 is assembled with the housing plate 110, as shown in FIG. 9B, the protruding part 370 extends into the breach 171 of the support plate 170 to serve as a single-sided positioning device. Then, the button 500 rotates to the lock position 230 to further relatively position the cover plate 300 and the housing plate 110. In the embodiment of FIG. 9A and FIG. 9B, if the edge 150 of the housing plate 110 is disposed with the breach 171 on one side, then the button 500 is not necessary required on this side.

Figure 10:
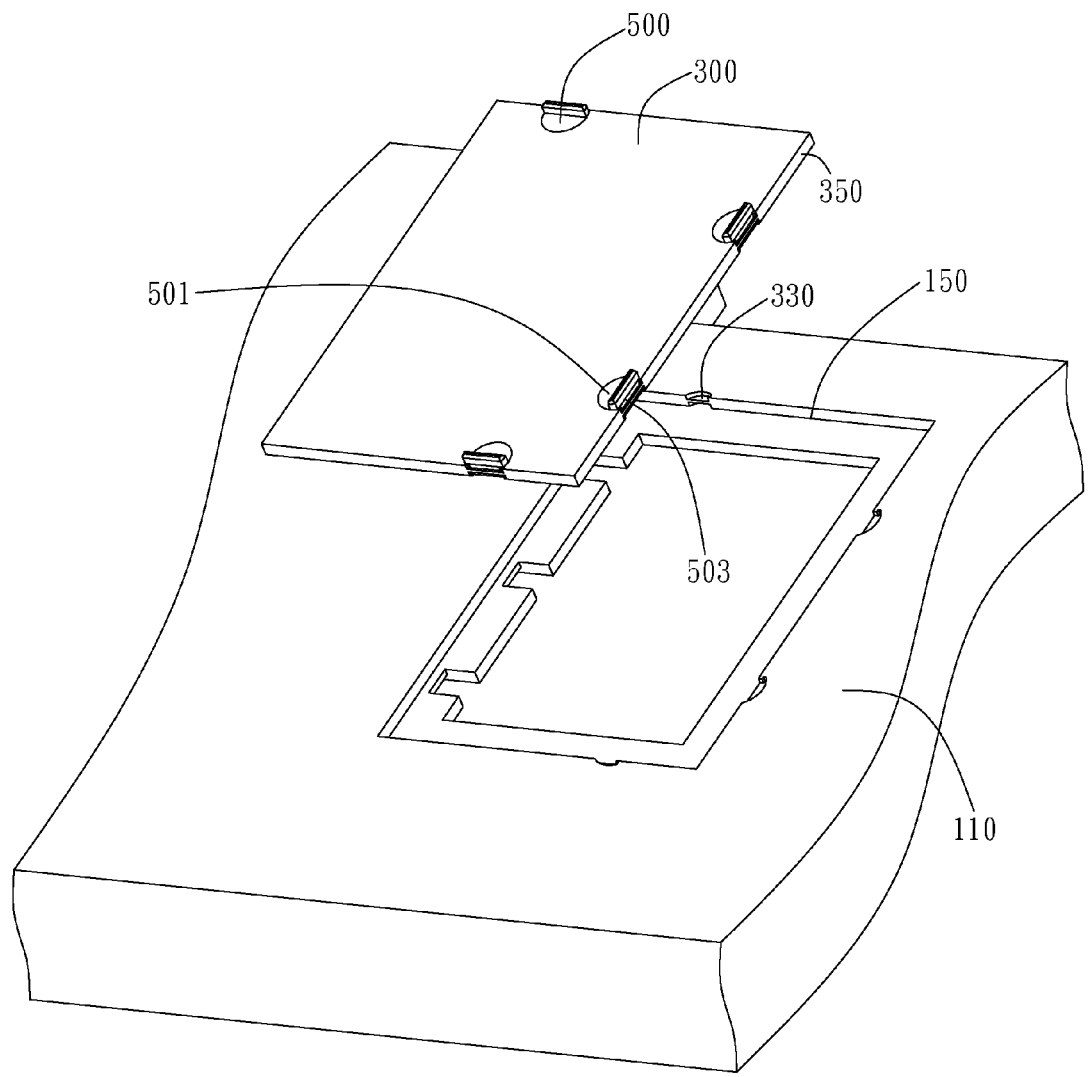
FIG. 10 is a schematic view of an embodiment showing the button disposed on the cover plate.

FIG. 10 is another embodiment of the electronic device. Compared to the previous embodiment, in this embodiment, the button 500 is pivotally connected to the cover plate 300 and the groove 330 is disposed on the edge 150 of the housing plate 110. Therefore, when the button 500 is in the release position, the long arm portion 501 retreats behind the edge 350 of the cover plate 300, and the short arm portion 503 faces outside the cover plate 300. When the button 500 rotates to the lock position, the long arm portion 501 extends out the edge 350 of the cover plate 300 and into the groove 330 of the housing plate 110. Furthermore, the positions of the foresaid sub-groove 310, the first recess 151, and the second recess 153 are correspondingly changed.

The present invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:

1. An electronic device, comprising:
    a housing having a housing plate with an opening, wherein a portion of an edge of the housing plate encompassing the opening extends inwardly to the opening to form a support plate and the support plate is formed with at least one breach;
    a cover plate separably disposed on the housing plate and correspondingly covering the opening, wherein the cover plate is supported by the support plate and has a groove formed on an edge of the cover plate, the groove has a groove bottom surface recessed from and parallel to a surface of the cover plate; and
    a button disposed at a different side on the edge of the opening with respect to the groove and rotating on the housing plate between a release position and a lock position, the button comprising a pivot, a first plate and a second plate, the pivot connecting the first plate and the second plate, wherein when the button rotates to the lock position, a portion of the button extends into the groove covering and at least a portion of the groove bottom surface is clamped between the first plate and the second plate such that the button relatively positions the cover plate and the housing plate.

2. The electronic device of claim 1, wherein the button further comprises a spacer, and when the housing is placed on a working surface, the spacer serves as a foot pad contacting the working surface such that a gap exists between the housing plate and the working surface to allow air flowing therethrough to facilitate heat dissipation and to reduce the occurrence of scratches on the housing plate and the cover plate due to friction with the working surface.

3. The electronic device of claim 2, wherein the spacer is formed as a protruding ridge on the surface of the button.

4. The electronic device of claim 1, wherein the button is a half-moon-shaped plate having a curve side and a chord side connecting two ends of the curve side.

5. The electronic device of claim 1, wherein a sidewall of the groove is formed with a first engaging part, and the button has a second engaging part, and wherein when the button rotates to the lock position, the first engaging part is engaged with the second engaging part, and when the button rotates to the release position, the first engaging part and the second engaging part are separated from each other.

6. The electronic device of claim 5, wherein the first engaging part is an engaging hole on the sidewall of the groove, and the second engaging part is a hook, and wherein when the button rotates to the lock position, the hook is inserted into the engaging hole.

7. The electronic device of claim 5, wherein the first engaging part is a hook protruding from the sidewall of the groove, and the second engaging part is a recessed hole, and wherein when the button rotates to the lock position, the hook is inserted into the recessed hole.

8. The electronic device of claim 1, wherein the housing plate has a first recess and a second recess on two surfaces of the edge encompassing the opening, and the first plate and the second plate are rotatably accommodated in the first recess and the second recess, respectively.

9. The electronic device of claim 8, wherein the first plate and the second plate pass through the housing plate connected by the pivot.

10. The electronic device of claim 8, wherein the cover plate has a top surface and a bottom surface opposite to each other, the groove is formed on the top surface of the cover plate, the bottom surface is formed with a sub-groove opposite to the groove, the groove corresponds to the first recess of housing plate, and the sub-groove corresponds to the second recess.

11. The electronic device of claim 10, wherein when the button rotates to the lock position, the cover plate is located between the first plate and the second plate.

12. An electronic device, comprising:
a housing having a housing plate with an opening, wherein a portion of an edge of the housing plate encompassing the opening extends inwardly to the opening to form a support plate, and the housing plate has a groove formed on the edge encompassing the opening, the groove has a groove bottom surface recessed from and parallel to a surface of the housing plate;
a cover plate separably disposed on the housing plate and correspondingly covering the opening, wherein the cover plate is supported by the support plate; and
a button disposed at a different side on the edge of the opening with respect to the groove and rotating between a release position and a lock position, the button comprising a pivot, a first late and a second plate, the pivot connecting the first plate and the second plate, wherein when the button rotates to the lock position, a portion of the button extends into the groove and at least a portion of the groove bottom surface is clamped between the first plate and the second plate;
wherein a first engaging part is formed on a sidewall of the groove, and the button has a second engaging part; the first engaging part is one of a hook and an engaging hole while the second engaging part is the other one of the hook and the engaging hole, when the button rotates to the lock position, the hook is engaged with the engaging hole such that the button cooperate to relatively positions the cover plate and the housing plate; and when the button rotates to the release position, the hook is separated from the engaging hole such that the cover plate and the housing plate may be separated from each other.

13. The electronic device of claim 12, wherein the button further comprises a spacer, and when the housing is placed on a working surface, the spacer serves as a foot pad contacting the working surface such that a gap exists between the housing plate and the working surface to allow air flowing therethrough to facilitate heat dissipation and to reduce the occurrence of scratches on the housing plate and the cover plate due to friction with the working surface.

14. The electronic device of claim 13, wherein the spacer is formed as a protruding ridge on the surface of the button.

15. The electronic device of claim 12, wherein the button is a half-moon-shaped plate having a curve side and a chord side connecting two ends of the curve side.

16. The electronic device of claim 12, wherein the cover plate has a first recess and a second recess on two opposite surfaces, and the first plate and the second plate are rotatably accommodated in or extend from the first recess and the second recess, respectively.

17. The electronic device of claim 16, wherein the first plate and the second plate pass through the cover plate connected by the pivot.

18. The electronic device of claim 16, wherein the housing plate has a top surface and a bottom surface opposite to each other, the groove is formed on the top surface of the housing plate, the bottom surface is formed with a sub-groove opposite to the groove, the groove corresponds to the first recess of the cover plate, and the sub-groove corresponds to the second recess of the cover plate.

19. The electronic device of claim 18, wherein when the button rotates to the lock position, the housing plate is located between the first plate and the second plate.

* * * * *